United States Patent
Klausler

Patent No.: US 6,308,250 B1
Date of Patent: Oct. 23, 2001

(54) METHOD AND APPARATUS FOR PROCESSING A SET OF DATA VALUES WITH PLURAL PROCESSING UNITS MASK BITS GENERATED BY OTHER PROCESSING UNITS

(75) Inventor: Peter Michael Klausler, Minneapolis, MN (US)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

(21) Appl. No.: 09/103,201

(22) Filed: Jun. 23, 1998

(51) Int. Cl.[7] .................................................. G06F 15/00
(52) U.S. Cl. .................. 712/5; 712/6; 712/9; 712/17; 712/19; 712/22; 709/104; 709/105
(58) Field of Search .................. 712/1, 2, 3, 5, 712/7, 10, 11, 15–16, 21–22, 6, 8, 9, 13, 14, 17, 18, 19, 20; 709/102, 103, 104, 105

(56) References Cited

U.S. PATENT DOCUMENTS

| | | | |
|---|---|---|---|
| 3,699,532 | * 10/1972 | Schaffer et al. | 902/37 |
| 4,356,547 | * 10/1982 | Barcaroli et al. | 712/34 |
| 4,858,115 | * 8/1989 | Rusterholz et al. | 712/7 |
| 4,881,168 | * 11/1989 | Inagami et al. | 364/200 |
| 5,349,682 | * 9/1994 | Rosenberry | 709/102 |
| 5,555,428 | * 9/1996 | Radigan et al. | 712/5 |
| 5,678,058 | * 10/1997 | Sato | 365/219 |
| 5,903,769 | * 5/1999 | Arya | 712/5 |
| 5,946,256 | * 8/1999 | Okimura | 365/221 |

* cited by examiner

Primary Examiner—Eddie Chan
Assistant Examiner—Dzung C. Nguyen
(74) Attorney, Agent, or Firm—Schwegman, Lundberg, Woessner & Kluth, P.A.

(57) ABSTRACT

A method and system for operating a computing system having multiple processing units. According to a new machine instruction, called the iota instruction, the computing system operates on a vector of mask bits to generate an iota vector having a sequence of values. In one form, each value of the iota vector is a sum of a series of the lower order mask bits up to and including the mask bit corresponding to the entry in the iota vector. In another form, each entry in the iota vector is a sum of a series of lower order mask bits but does not include the mask bit corresponding to the particular entry in the iota vector. In order to calculate the iota vector, the multiple processing units of the present invention communicate the mask bits to the other processing units. Advantages of the present invention include the vectorization of software loops having certain data hazards that prevented conventional compilers from vectorizing the software.

16 Claims, 3 Drawing Sheets

METHOD AND APPARATUS FOR PROCESSING A SET OF DATA VALUES WITH PLURAL PROCESSING UNITS MASK BITS GENERATED BY OTHER PROCESSING UNITS

FIELD OF THE INVENTION

This invention relates generally to the field of high-performance computers, and more particularly to a method and system for operating a computer having multiple processing units.

BACKGROUND

In order to accelerate the processing of data, many high-performance computing systems are controlled by a single-instruction stream yet operate on multiple-data streams (SIMD). One such computing system is a vector computer designed to process in parallel each element of a linear array of numbers. For example, a vector machine adds two vectors by adding in parallel each entry of the two vectors to produce a single vector of the same length. A single vector instruction is therefore equivalent to a programming loop iterating from 1 to the number of elements in the vector.

Wherever possible, a specialized compiler replaces programming loops with vector instructions. Whether a compiler can vectorize a loop often depends on whether each element in a result vector can be computed independently from the other elements. When the results of one iteration of the loop depend on results of previous iterations, a data hazard exists and the loop typically cannot be "vectorized". The extent that a program can be vectorized, however, not only depends on the existence of data hazards but on the ability of the compiler to restructure the program in order to reduce or eliminate the data dependencies. Thus, there is tremendous variation the software routines that conventional compilers can vectorize.

One class of software that conventional compilers have difficulty vectorizing is inductive loops having conditional statements. Typical examples of this class of software includes vector compression and vector expansion. In vector compression, elements of a source vector are copied to a destination vector based on some condition such as a mask bit. Thus, only a subset of the elements of the source vector are copied to the destination vector and are stored in the lower order elements of the destination vector. Because the destination of a particular source element depends on how many elements need to be copied, a data hazard exists that prevents the compression from easily being vectorized. Similar problems exist for vector expansion.

For the reasons stated above, and for other reasons stated below which will become apparent to those skilled in the art upon reading and understanding the present specification, there is a need in the art for a method and system for operating a computer having multiple processing unit that easily vectorize inductive loops having conditional statements. There is also a need for an optimizing compiler which can generate machine instructions for such a computer system.

SUMMARY OF THE INVENTION

As explained in detail below, the present invention is directed to a method and system for operating a computer having multiple processing units. According to the invention, each processing unit is loaded with at least one data value of a set of data values and commanded to generate a mask bit for each loaded data value. The processing units communicate the generated mask bits to each other such that each processing unit receives the mask bits generated by the other processing units. Finally, the processing units process each loaded data value as a function of the loaded data value's respective generated mask bit and at least one of the mask bits received from another processing unit.

According to one feature of the invention, the processing units calculate each of a plurality of iota values by summing a series of the generated mask bits. In one embodiment, each iota value is calculated by summing all mask bits having an ordinal position lower than an ordinal position of the calculated iota value. In another embodiment, each iota value is calculated by summing the mask bits having an ordinal position lower than the ordinal position of the calculated iota value and the mask bit having an ordinal position equal to the ordinal position of the calculated iota value.

According to another aspect, the present invention is a computer for processing a set of data values. The computer includes a plurality of processing units that are loaded with at least one data value of the set of data values. Each processing unit generates a mask bit for each loaded data value. A plurality of data pipes communicatively couple each processing unit such that each processing unit receives the mask bits generated by the other processing units. The processing units calculate a plurality of iota values by summing a series of the generated mask bits.

According to yet another aspect, the invention is a method of compiling a software module for processing a set of data values using a computer having a plurality of communicatively coupled processing units. The method includes generating a first machine language instruction to command the processing units to generate a mask bit for each data value of the set of data values. A second machine language instruction is generated to command the processing units to calculate an iota value for each of the generated mask bits by summing a series of the generated mask bits. In one embodiment, the first machine language instruction commands each processing unit communicate the set of mask bits to the other processing units. In another embodiment, the second machine language instruction commands each processing unit to communicate the set of mask bits. The method further includes generating a third machine language instruction to command the processing units to process the set of data values as a function of the calculated iota values.

According to another aspect, the present invention is a compiler for a computer having a plurality of communicatively coupled processing units. The compiler generates a single machine language instruction to command the computer to calculate a vector of iota values from a mask vector having a plurality of mask bits, wherein each iota value of the iota vector is calculated by summing a series of the mask bits.

These and other features and advantages of the invention will become apparent from the following description of the preferred embodiments of the invention.

DETAILED DESCRIPTION

In the following detailed description, references are made to the accompanying drawings that illustrate specific embodiments in which the invention may be practiced. Electrical and programmatic changes may be made to the embodiments without departing from the spirit and scope of the present invention. The following detailed description is, therefore, not to be taken in a limiting sense and the scope of the present invention is defined by the appended claims and their equivalents.

Figure 1:
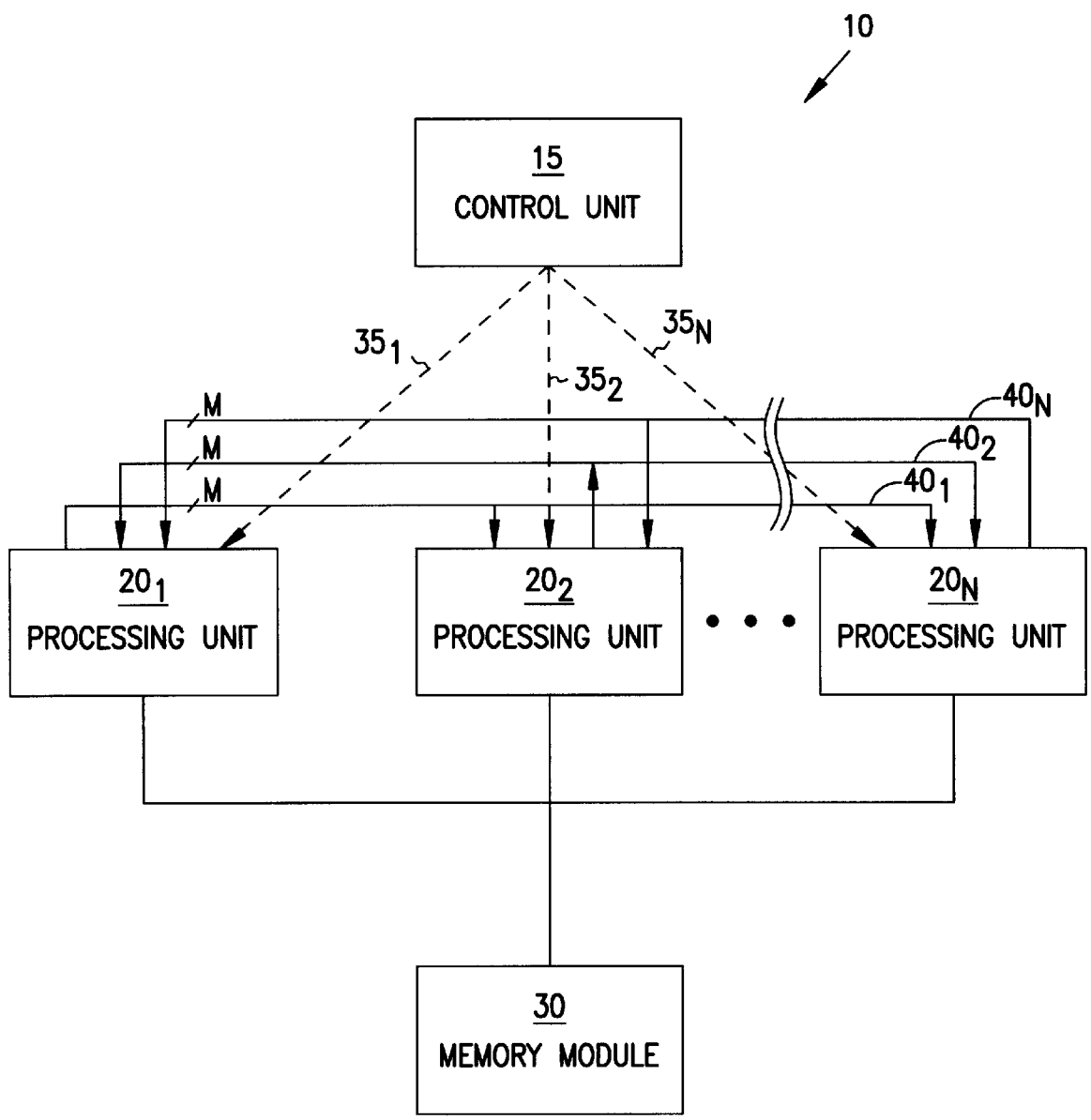
FIG. 1 is a block diagram of a computing system having multiple communicatively coupled processing units for execution according to the present invention.

FIG. 1 illustrates one embodiment of a computing system 10 shown in block diagram form. Computing system 10 includes control unit 15, a plurality of processing units 20 and memory module 30. Each processing unit 20 is capable of operating on one or more data elements. For example, in one embodiment, each processing unit 20 is capable of performing a single calculation such as addition or multiplication. In another embodiment, each processing unit 20 includes multiple execution units, such as adders or multipliers, and is therefore capable of processing multiple data elements in parallel. In one embodiment, computing system 10 includes four processing units 20, where each processing unit 20 includes sixteen execution units. In this embodiment, computer system 10 is therefore capable of processing 64 data elements in parallel.

Control unit 15 commands processing units 20 by issuing instructions to processing units 20 via control lines 35. For example, control unit 15 may command processing units 20 to retrieve two vectors of data from memory 30, add the retrieved vectors and store a result vector in memory 30. In performing such an operation, each processing unit 20 loads a subset of the retrieved data elements, operates on the loaded subset of data element and stores the results in memory 30. For example, if computing system 10 includes four processing units 20 having 16 processors, each vector retrieved from memory 30 contains 64 elements of data. In this embodiment, each of the four processing units is loaded with 16 elements of each retrieved vector, computes 16 elements of the result and stores the computed results in memory 30, thereby producing a 64 entry result vector, each entry having an ordinal value ranging from 0 to 63.

Unlike computing system 10, many conventional systems are unable to vectorize data operations where data elements depend upon the results of operations on other data elements of the data element set. One example of such an operation is a vector compression operation. In a vector compression operation, a subset of the data elements of a source vector are selected and copied to a destination vector. Typically the data elements of the subset are selected when the particular data element satisfies a predetermined condition. Consider the following code illustrating vector compression from a 64 entry source vector A to a 64 entry destination vector B:

```
j=1
do I=1,64
   if ( A(I) .gt. 0) then
      B(j)=A(I)
      j=j+1
   endif
enddo
```

Vectorization of the above software loop is difficult because the destination address within vector B depends upon how many previous elements have been copied Similar difficulties exist for the following vector expansion loop:

```
j=0
do I=1,64
   if (A(I) .gt. 0) then
      j=j+1
   endif
   D(I)=S(j)
enddo
```

In accordance with the present invention, processing units 20 of computing system 10 are communicatively interconnected via communication pipes 40. More specifically, computing system 10 includes N communication pipes 40, one for each processing unit 20. Each communication pipe 40 is M bits wide where M is the length of vectors processed by each processing unit 20. For example, if computing system 10 includes four processing units 20 having sixteen execution units, N equals four while M equals sixteen. In order to vectorize inductive loops having a conditional statement, such as vector compression and vector expansion, each processing unit 20 generates a corresponding mask bit for each loaded data value based on the condition and communicates the generated mask bits to all other processing units 20. The received mask bits allow each processing unit 20 to independently processes each of the loaded data elements. As illustrated in detail below, in one embodiment, each value of the iota vector is a sum of a series of lower order mask bits up to and including the mask bit corresponding to the entry in the iota vector. In another embodiment, each entry in the iota vector is a sum of a series of lower order mask bits not including the mask bit corresponding to the particular entry in the iota vector. In response to subsequent machine language instruction, computing system 10 uses the calculated iota vector to independently process each data value, thereby vectorizing the inductive loop without communicating data values between processing units 20.

Figure 2:
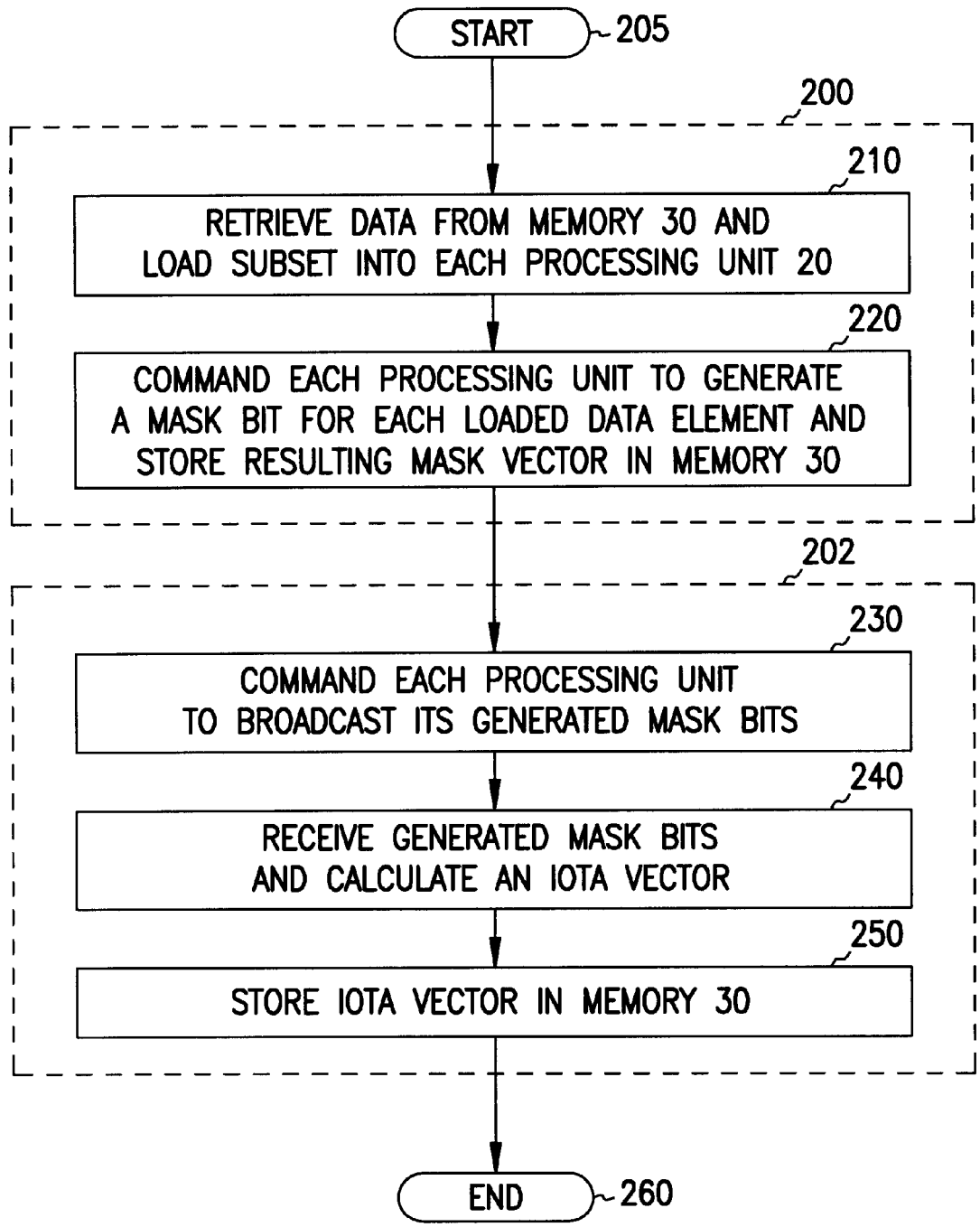
FIG. 2 is a flow chart illustrating one mode of operation of the computing system of FIG. 1 in which an iota vector is calculated in accordance with the present invention.

FIG. 2 is a flow chart illustrating one mode of operation of computing system 10 (FIG. 1) for calculating an iota vector in accordance with the present invention. The flow chart of FIG. 2 includes two phases. In phase 200 a mask vector is generated and in phase 202 an iota vector is generated as a function of the mask vector. In one embodiment, an optimizing compiler generates a single machine instruction to command computing system 10 to perform both phases 200 and 202. In another embodiment, an optimizing compiler generates a separate machine instruction for each phase 200 and 202.

Computing system 10 begins with step 205 and immediately proceeds to step 210 where control unit 15 commands processing units 20 to retrieve a vector from memory 30. In this fashion, each processing unit 20 is loaded with a subset of the data elements of the retrieved vector. In one embodiment, computing system 10 is a vector machine having four interleaved processing units 20. For example, assuming a vector having sixteen elements, processing unit $20_1$ is loaded with data elements 0, 4, 8,12, processing unit $20_2$ is loaded with data elements 1, 5, 9,13, processing unit $20_3$ is loaded with data elements 2, 6, 10, 14, and processing unit $20_1$ is loaded with data elements 3, 7, 11, 15.

Computing system 10 proceeds from step 210 to step 220 where control unit 15 commands each processing unit 20 generate a mask bit for each loaded data element based on the conditional statement of the inductive loop. For example, the mask bit may be set to a true logic value when the corresponding data entry is greater than zero. In another embodiment each corresponding mask bit is set by comparing the corresponding data entry to a data entry of another reference vector. After generating mask bits for each loaded data entry, processing units 20 write the generated mask bits to memory 30, thereby storing a complete mask vector.

Upon completing phase 200, computing system 10 proceeds to step 230 where control system 15 commands processing units 20 to communicate their generated mask bits to each of the other processing units 20. In one embodiment, processing units 20 retrieve mask vector from memory 30 and communicate their loaded mask bits. Alternatively, steps 220 and 230 may be combined such that processing units 20 generate the mask bits, store the mask bits and broadcast the mask bits without needing to retrieve the mask bits from memory 30.

Upon completing step 230, computing system 10 proceeds to step 240 and command processing units 20 to calculate the iota vector as a function of the mask vector. More specifically, the iota vector contains a sequence of values where each value is a sum of a series of mask bits having an ordinal value up to and including the ordinal value of the entry in the iota vector. In another embodiment, the summation does not includes the mask bit corresponding to the entry in the iota vector. Therefore, in mathematical terms, the iota vector can be defined as follows:

$$Iota[j] = \sum_{i=0}^{j} Mask[i]$$

or alternatively:

$$Iota[j] = \sum_{i=0}^{j-1} Mask[i] \text{ for } j > 0 \text{ and } Iota[0] = 0$$

where Mask is the mask vector, Iota is the iota vector and j is a ordinal value ranging from 0 to M−1 where M is the number of data elements in a standard vector for computing system 240. The advantages of the present invention may be realized by using either of these definitions and, given an iota vector computed using one of these techniques, an iota vector using the other can easily be computed. Therefore, the following discussion assumes an iota vector where each summation does not include the mask bit corresponding to the entry in the iota vector, i.e., the second definition. Upon calculating the iota vector in step 240, computing system 10 proceeds to step 250 and stores the computed iota vector in memory 30.

Example of Iota Vector Calculation

The following example illustrates calculation of an iota vector in a computing system having two interleaved processing units capable of processing vectors having four data elements. Assume that a mask vector MASK was retrieved from memory and has the following eight elements [1,1,0,1,0,0,1,0] where the leftmost entry signifies MASK[0] and the rightmost entry signifies MASK[7]. The first processing unit, P0, therefore receives a subset of these elements. More specifically, P0 receives the even elements [1,0,0,1] while the second processing unit, P1, receives the odd elements [1,1,0,0]. Each processing unit, P0 and P1, broadcast their respective bits via communication pipes such that each processing unit has a full mask vector of eight elements. Based on the eight mask bits, each processing unit, P0 and P1, independently calculates four iota values, where each iota value is a sum of the lower order mask bits. Based on the above example, P0 generates values of [1,2,3,4] and P1 generates the values [2,3,3,4]. Each processing unit stores the generated values in memory such that the complete iota vector is stored as [1,2,2,3,3,3,4,4].

Figure 3:
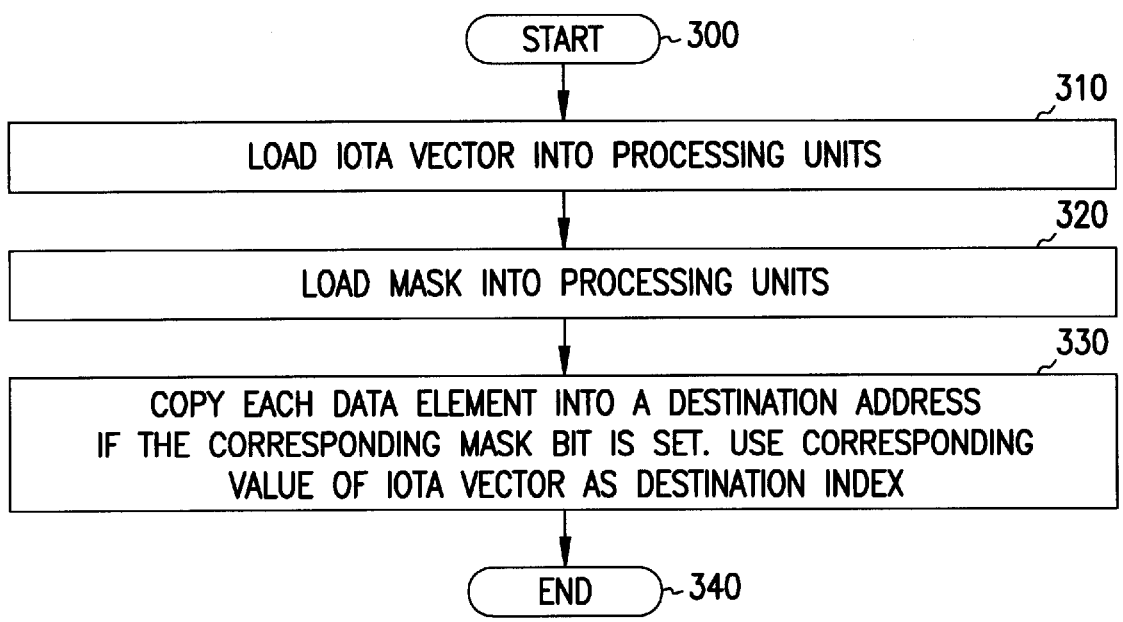
FIG. 3 is a flow chart illustrating one mode of operation of the computing system of FIG. 1 in which a previously calculated iota vector is used to independently compress a source vector into a destination vector.

FIG. 3 is a flow chart illustrating one mode of operation of computing system 10 (FIG. 1) in which a previously calculated iota vector of index values is used to vectorize the compression of a source vector into a destination vector. In order to compress the source vector, computing system 10 begins with step 300 and immediately proceeds to step 310 where control unit 15 commands processing units 20 to retrieve the calculated iota vector from memory 30. Computing system 10 proceeds to step 320 where control unit 15 similarly commands processing units 20 to retrieve the generated mask vector from memory 30. Each processing unit is loaded with a subset of the data elements of the iota vector and with a subset of the data elements of the mask vector. In step 330, control unit 15 commands processing units 20 to copy each data element of the source vector into the destination vector when the corresponding mask bit is set. Furthermore, control unit 15 commands processing units 20 to store each data element using the index value of iota vector as an index into a destination vector. In other words, each processing unit 20 examines each of the loaded mask bits in parallel. For each set mask bit, processing units 20 copy the corresponding data entry in a source vector to a destination vector using the corresponding data entry in the iota vector to generate an index into the destination vector. In this fashion, computing system 10 vectorizes the compression of the source vector into the destination vector using an iota vector.

Example of Vector Compression Using an Iota Vector

The following example illustrates vector compression using an iota vector in a computing system having two interleaved processing units capable of processing four data elements each. Assume a source vector S[0 . . . 7] equaling [25,22,−15,17,−11,−2,5,−9]. If a mask vector is generated based on the condition that a mask bit is set when the corresponding data entry is greater than zero, MASK[0 . . . 7] equals [1,1,0,1,0,0,1,0] and the iota vector equals [1,2,2, 3,3,3,4,4] as in the above example.

In order to compress the source vector, each processing unit, P0 and P1, examines a subset of mask bits M and copies data elements from S when the corresponding mask bit is set. P0 examines the subset of mask bits [1,0,0,1] while P1 examines the subset [1,1,0,0]. Based on the set mask bits, the processing units copy each data element into a corresponding element of the destination vector based on an index value calculated from a respective element of the iota vector. In this example the iota vector is generated according to the second definition described above, thus the calculated index value equals the value of the respective iota element minus one. As such, P0 copies S[0] and S[6] to D[0] and D[3], respectively. Similarly, P1 copies S[1] and S[3] to D[1] and D[2] respectively resulting in D[0 . . . 7] equaling [25,22, 17,5,x,x,x,x] where x indicates the data entry is left unchanged. By using an iota vector, P0 and P1 are able to independently vectorize the compression of the source vector into the data vector.

Figure 4:
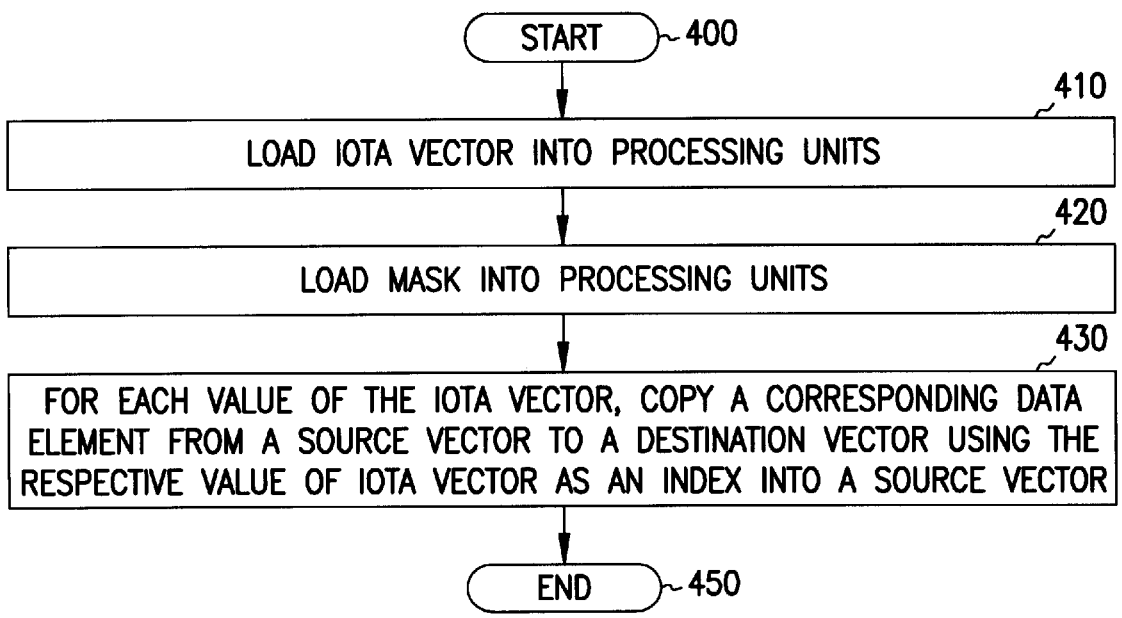
FIG. 4 is a flow chart illustrating one mode of operation of the computing system of FIG. 1 in which a previously calculated iota vector is used to independently expand a source vector into a destination vector.

FIG. 4 is a flow chart illustrating one mode of operation of computing system 10 (FIG. 1) in which a previously calculated iota vector of index values is used to independently expand a source vector into a destination vector. In order to expand the source vector, computing system 10 begins with step 400 and immediately proceeds to step 410 where control unit 15 commands processing units 20 to retrieve the calculated iota vector from memory 30. Computing system 10 proceeds to step 420 where control unit 15 similarly commands processing units 20 to retrieve the generated mask vector from memory 30. Each processing unit is loaded with a subset of the data elements of the iota vector and with a subset of the data elements of the mask vector. In step 430, control unit 15 commands processing units 20 to use each entry of the iota vector as an index into source vector S. For each value in the iota vector, processing units 20 copies each indexed entry in the source vector into the destination vector. In this fashion, computing system 10 vectorizes the expansion of a source vector S into the destination vector D without communicating data elements between processing units 20.

Example of Vector Expansion Using an Iota Vector

The following example illustrates vector expansion using an iota vector in a computing system having two interleaved processing units capable of processing four data elements each. As in the above examples, assume a source vector S[0 ... 7] equaling [25,22,−15,17,−11,−2,5,−9], a corresponding mask vector MASK[0 ... 7] equaling [1,1,0,1,0,0,1,0] and a calculated iota vector of [1,2,2,3,3,3,4,4].

Each processing unit P0 and P1 retrieves a data entry from source vector S for each index in the iota vector and copies the retrieved entry into destination vector D. Based on the calculated iota vector, D equals [S[1],S[2],S[2],S[3],S[3],S[3],S[4],S[4]] which, in this example, equals [22,−15,−15, 12,12,12,−11,−11]. Thus, by using an iota vector and a mask vector, P0 and P1 are able to independently vectorize the expansion of a source vector into a data vector.

Various embodiments of a method and system for operating a computer having multiple processing units have been described. According to an new machine instruction, called the iota instruction, the computing system operates on a plurality of mask bits to generate an iota vector having a sequence of values. Each processing unit of the computing system generate a subset of the mask bits of the mask vector and communicates the generated mask bits to the other processing units in order to calculate the iota vector. In one embodiment, each value of the iota vector is a sum of a series of lower order mask bits up to and including the mask bit corresponding to the entry in the iota vector. In another embodiment, each entry in the iota vector is a sum of a series of lower order mask bits not including the mask bit corresponding to the particular entry in the iota vector.

Several advantages of the present invention have been illustrated including expanding the class of software loops that are vectorizable by a computer having multiple processing units. The present invention enables an optimizing compiler to automatically vectorize conditional statements in inductive loops and eliminates the need for communication of data elements between the processing units. The present invention is suitable for vectorizing the expansion or compression of a source vector into a destination vector. This application is intended to cover any adaptations or variations of the present invention. It is manifestly intended that this invention be limited only by the claims and equivalents thereof.

What is claimed is:

1. A method for processing a set of data values with a computer having a number of communicatively coupled processing units comprising the steps of:
    loading each processing unit with at least one data value of the set of data values;
    commanding each processing unit to generate a mask bit for each loaded data value;
    communicating the mask bits generated in the commanding step such that each processing unit receives the mask bits generated by other of the processing units; and
    processing each data value with the processing units as a function of the data value's respective generated mask bit and at least one of the received mask bits.

2. The method of claim 1, wherein the processing step comprises the step of calculating each of a plurality of iota values by summing a series of the generated mask bits.

3. The method of claim 2, wherein the mask bits form a mask vector having a plurality of ordinal positions and the plurality of iota values form an iota vector having a plurality of ordinal positions.

4. The method of claim 3, wherein the processing step calculates each iota value by summing all mask bits having a lower ordinal position than the ordinal position of the calculated iota value.

5. The method of claim 3, wherein the processing step calculates each iota value by summing the mask bits having an ordinal position lower than the ordinal position of the calculated iota value and the mask bit having an ordinal position equal to the ordinal position of the calculated iota value.

6. The method of claim 3, wherein the processing step comprises the step of compressing the set of data values into a memory region having a plurality of destination addresses by copying each loaded data value into a selected one of the destination address when the mask bit having an ordinal value equal to the ordinal position of the loaded data value is set, wherein the destination address is selected based on the iota value having an ordinal position equal to the ordinal position of the set mask bit.

7. The method of claim 3, wherein the processing step comprises the step of expanding the set of data values into a memory region having a plurality of destination addresses by copying each of a selected subset of the loaded data values into the memory region, wherein the subset of the loaded data value is selected based on the index values.

8. The method of claim 1, wherein the computer is a vector processing computer having a plurality of vector processors.

9. The method of claim 1, wherein the vector processing computer has two vector processors.

10. A computer for processing a set of data values comprising:
    a plurality of processing units, wherein each processing unit is loaded with at least one data value of the set of data values, and further wherein each processing unit generates a mask bit for each loaded data value as a function of the loaded data value; and
    a plurality of data pipes communicatively coupling each processing unit such that each processing unit receives the mask bits generated by the other processing units.

11. The computer of claim 10, wherein the processing units calculates a plurality of iota values by summing a series of the generated mask bits.

12. The computer of claim 11, wherein each processing unit includes a vector processor, and further wherein the generated mask bits form a mask vector having a plurality of ordinal positions and the plurality of iota values form an iota vector having a plurality of ordinal positions.

13. The computer of claim 12, wherein each processing unit calculates each iota value of the corresponding plurality of iota values by summing the generated mask bits having a lower ordinal position than the ordinal position of the calculated iota value.

14. The computer of claim 12, wherein each processing unit calculates each iota value of the corresponding plurality of iota values by summing the generated mask bits having an ordinal position lower than the ordinal position of the calculated iota value and the mask bit having an ordinal position equal to the ordinal position of the calculated iota value.

15. The computer of claim 12, further comprising a memory region having a plurality of destination addresses, wherein each processing unit copies each loaded data value into a selected one of the plurality of destination address when the generated mask bit having an ordinal position equal to the ordinal position of the data value is set, and further wherein the destination address is selected based on the iota value having an ordinal position equal to the ordinal position of the set mask bit.

16. The computer of claim 12, further comprising a memory region having a plurality of destination addresses, wherein each processing unit copies each of a selected subset of the loaded data values into the memory region, wherein the subset of data value is selected based on the iota values.

* * * * *

UNITED STATES PATENT AND TRADEMARK OFFICE
CERTIFICATE OF CORRECTION

PATENT NO.  : 6,308,250 B1
DATED       : October 23, 2001
INVENTOR(S) : Peter Michael Klausler Page 1 of 1

It is certified that error appears in the above-identified patent and that said Letters Patent is hereby corrected as shown below:

<u>Column 4,</u>
Line 58, delete "20" and insert -- 20$_1$ --, therefor.

<u>Column 5,</u>
Line 23, delete "includes" and insert -- include --, therefor.

<u>Column 6,</u>
Line 53, delete "D[1]" and insert -- D[1] --, therefor.

Signed and Sealed this

Fourth Day of June, 2002

Attest:

Attesting Officer

JAMES E. ROGAN
*Director of the United States Patent and Trademark Office*